United States Patent
Schreiber et al.

(10) Patent No.: US 9,898,143 B2
(45) Date of Patent: Feb. 20, 2018

(54) PREDICTING TOUCH EVENTS TO IMPROVE TOUCHSCREEN USAGE ACCURACY

(71) Applicant: Intel Corporation, Santa Clara, CA (US)

(72) Inventors: Geoff Y. Schreiber, Portland, OR (US); Joshua Boelter, Portland, OR (US); Mark E. Sprenger, Tigard, OR (US); Paul J. Gwin, Orangvale, CA (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 14/998,049

(22) Filed: Dec. 24, 2015

(65) Prior Publication Data

US 2017/0185232 A1 Jun. 29, 2017

(51) Int. Cl.
*G06F 3/042* (2006.01)
*G06F 3/041* (2006.01)

(52) U.S. Cl.
CPC .......... *G06F 3/0421* (2013.01); *G06F 3/0418* (2013.01)

(58) Field of Classification Search
CPC .......... G06F 3/017; G06F 2203/04101; G06F 2203/04106; G06F 3/0304; G06K 9/00362
See application file for complete search history.

(56) References Cited

U.S. PATENT DOCUMENTS

| | | | |
|---|---|---|---|
| 2009/0251423 A1* | 10/2009 | Jung | G06F 3/0488 345/173 |
| 2010/0111358 A1 | 5/2010 | Chai et al. | |
| 2011/0286676 A1 | 11/2011 | El Dokor | |
| 2011/0291945 A1* | 12/2011 | Ewing, Jr. | G06F 1/1686 345/173 |
| 2012/0280900 A1 | 11/2012 | Wang et al. | |
| 2013/0314317 A1 | 11/2013 | Wu et al. | |
| 2014/0258932 A1* | 9/2014 | Cho | G06F 3/0485 715/825 |
| 2015/0277569 A1 | 10/2015 | Sprenger et al. | |

FOREIGN PATENT DOCUMENTS

KR 20100045434 A 5/2010
WO 2015149049 A1 10/2015

OTHER PUBLICATIONS

International Search Report and Written Opinion for PCT Application No. PCT/US2015/023220, dated Jun. 26, 2015, 11 pages.
Stephen Azevedo et al., Micropower Impulse Radar, Science & Technology Review Jan./Feb. 1996, 7 pages.

* cited by examiner

*Primary Examiner* — Viet Pham
(74) *Attorney, Agent, or Firm* — Jordan IP Law, LLC (57) ABSTRACT

Systems, apparatuses and methods may detect a hand-based object in front of a touchscreen, determine one or more motion attributes of the detected hand-based object and initiate a halt of one or more user interface updates associated with the touchscreen if the one or more attributes correspond to an impending impact between the hand-based object and the touchscreen. In one example, the hand is detected based on a signal from one or more of a micro-impulse radar (MIR) device, an infrared (IR) depth sensor or a camera.

24 Claims, 5 Drawing Sheets

PREDICTING TOUCH EVENTS TO IMPROVE TOUCHSCREEN USAGE ACCURACY

TECHNICAL FIELD

Embodiments generally relate to touchscreen devices. More particularly, embodiments relate to predicting touch events to improve touchscreen usage accuracy.

BACKGROUND

Touchscreens may be used in devices such as smart phones, tablet computers, kiosks, and so forth, to facilitate user interactions with the device, wherein the user interface (UI) presented on a touchscreen display may include elements that are dynamically updated during use. Indeed, the updates may move elements from one location in the UI to another location while the user is attempting to make a selection from the UI. As a result, the user may tap areas on the touchscreen that are not the intended point of interaction. Accordingly, conventional touchscreen solutions may lead to poor usage accuracy, which may in turn result in a suboptimal user experience.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
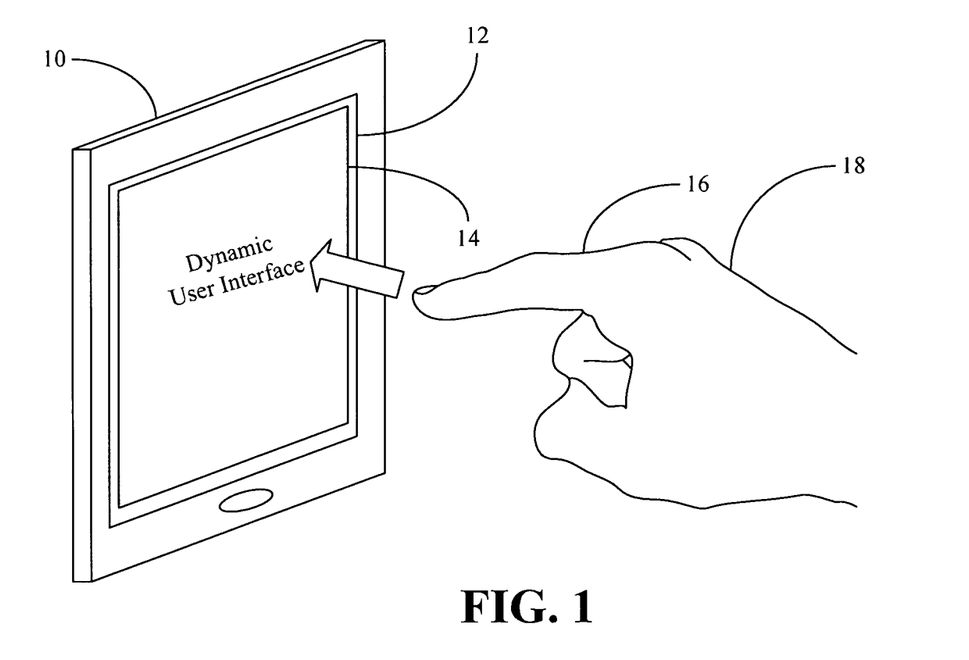
FIG. 1 is an illustration of an example of a touchscreen with a dynamic user interface according to an embodiment.

Turning now to FIG. 1, a computing device 10 with a touchscreen 12 is shown. In the illustrated example, a dynamic user interface (UI) 14 is displayed on the touchscreen 12. The UI 14 may be considered dynamic to the extent that one or more elements of the UI 14 are updated, moved and/or rearranged during the usage of the computing device 10. For example, the UI 14 might include a web page that presents search results, a window containing scrollable content, and so forth. As will be discussed in greater detail, the illustrated computing device 10 may be configured to detect a hand 18, in front of the touchscreen 12, determine one or more motion attributes (e.g., location, velocity, acceleration) of the hand 18, and automatically initiate a halt of one or more updates to the dynamic UI 14 if the motion attribute(s) correspond to an impending impact between at least a portion of the hand 18 and the touchscreen 12. For example, the computing device 10 might predict that a finger 16 is about to come into contact with the touchscreen 12 and pause the addition of search results and/or the scrolling of content on the UI 14 in response to the prediction.

Figure 2:
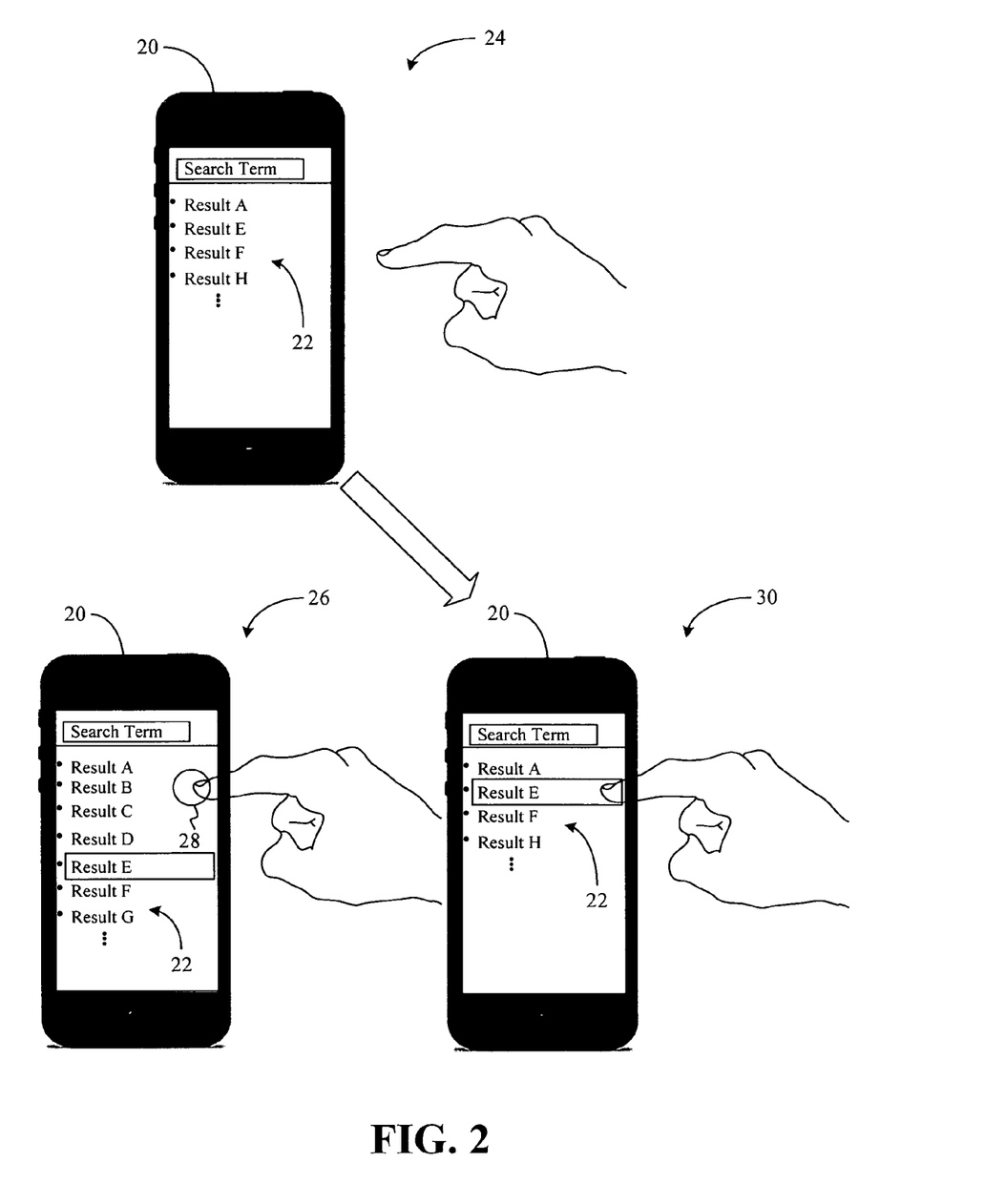
FIG. 2 is an illustration of an example of a touchscreen usage scenario according to an embodiment.

For example, FIG. 2 shows a scenario in which a computing device 20 displays a dynamic UI such as a search page 22 on a touchscreen of the computing device 20. In an initial state 24, the user has entered a query ("Search Term") into the search page 22, and the device 20 has retrieved preliminary results that include "Result A", "Result E", "Result F" and "Result H", sorted by, for example, date (not shown) on the search page 22. If the user reaches for Result E while results are still being retrieved and added to the search page 22, a conventional subsequent state 26 might result in a finger of the user touching an area 28 of the search page 22 that has been updated to replace Result E with a different result (e.g., "Result B"). By predicting the touch event, however, the computing device 20 may enter an enhanced subsequent state 30 in which updates to the UI have been halted. As a result, the area of the search page 22 touched by the finger of the user may contain the targeted Result E in the enhanced subsequent state 30. Accordingly, improved touchscreen usage accuracy may be achieved.

Figure 3:
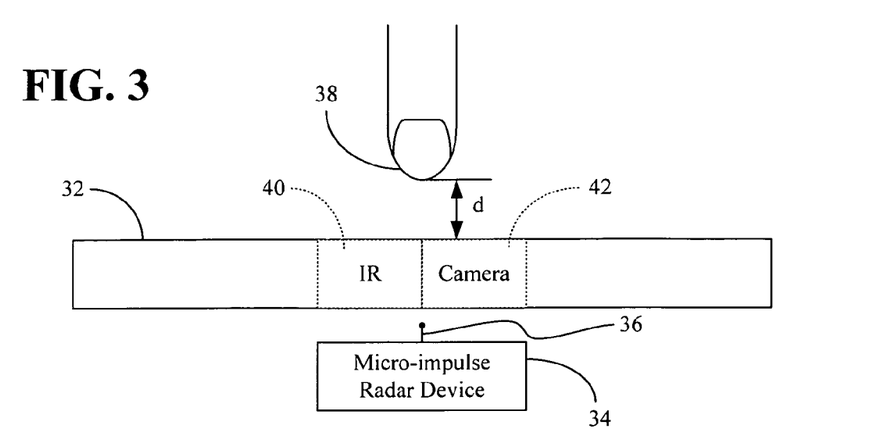
FIG. 3 is a top view of an example of a finger interaction with a touchscreen according to an embodiment.

Turning now to FIG. 3, a top view of a touchscreen 32 is shown in which a micro-impulse radar (MIR) device 34 (e.g., transceiver) is positioned behind the touchscreen 32. The MIR device 34 may include one or more directional antennae 36 that may transmit electromagnetic pulses (e.g., outbound pulses) and monitor the environment for reflected pulses (e.g., inbound pulses) from hand-based objects in front of the touchscreen 32 such as, for example, a fingertip 38 of a nearby hand. The monitoring may involve the use of triangulation techniques, which are facilitated by the deployment of multiple antennae 36. Moreover, the outbound and inbound pulses may penetrate the touchscreen 32 while still being able to detect the fingertip 38 due to the nature of the pulses. The outbound and inbound pulses may also be unaffected by the amount of light in the environment and may enable object detection in the dark. In the illustrated example, motion attributes such as the location (e.g., distance "d"), velocity and/or acceleration of the fingertip 38 relative to the touchscreen 32 may be identified and used to determine whether there is an impending impact between the fingertip 38 and the touchscreen 32.

Other devices such as, for example, an infrared (IR) depth sensor 40 and/or a camera 42 may be used to detect the fingertip 38 as well as the motion attributes of the fingertip 38. For example, the IR depth sensor 40 may generate signals and/or frame data that indicate the distance of the fingertip 38 from the touchscreen 32, wherein the frame rate may be used to determine time-based attributes such as velocity/acceleration. Additionally, signals and/or frame data from the camera 42 may further provide relevant motion attribute information.

Figure 4:
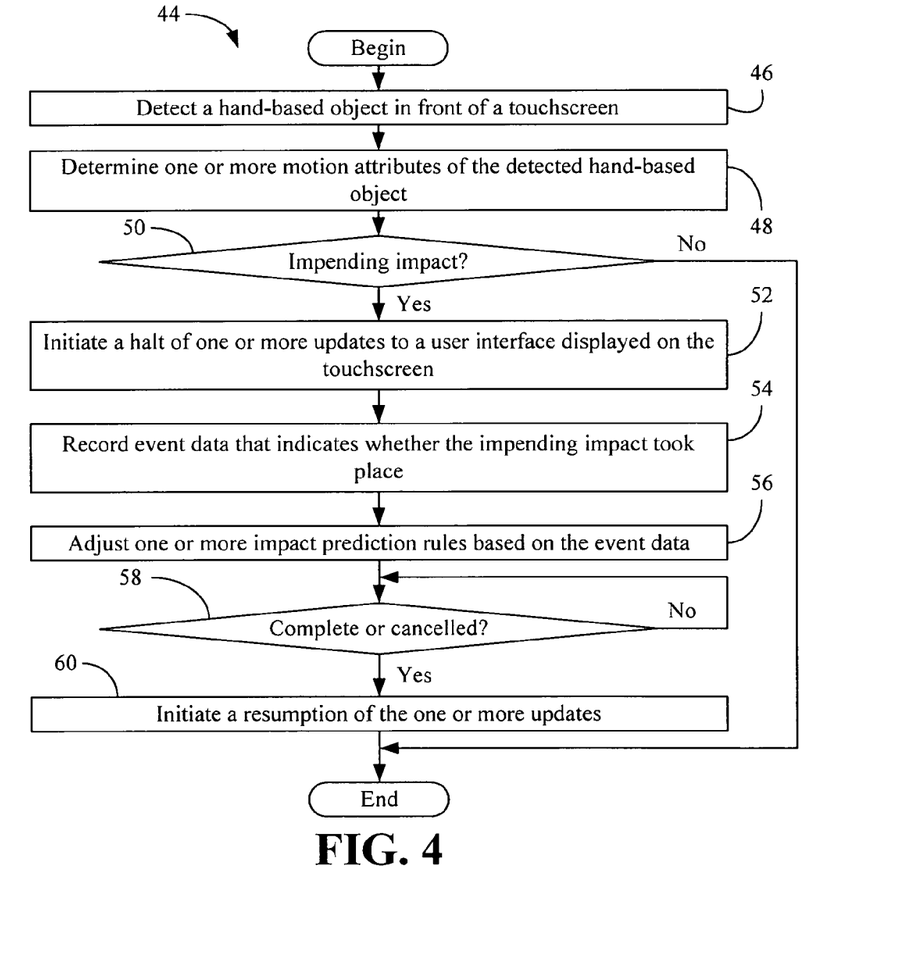
FIG. 4 is a flowchart of an example of a method of operating an accuracy improvement apparatus according to an embodiment.

FIG. 4 shows a method 44 of operating an accuracy improvement apparatus. The method 44 may generally be implemented in a computing device such as, for example, the computing device 10 (FIG. 1) and/or the computing device 20 (FIG. 2), already discussed. More particularly, the method 44 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 44 may be written in any combination of one or more programming languages, including an object oriented programming language such as JAVA, SMALLTALK, C++ or the like and conventional procedural programming languages, such as the "C" programming language or similar programming languages.

Illustrated processing block 46 may provide for detecting a hand-based object (e.g., hand, finger, thumb, fingertip, glove, stylus) in front of a touchscreen, wherein one or more motion attributes of the detected hand-based object may be determined at block 48. As already noted, the hand may be detected based on a signal from one or more of an MIR device, an IR depth sensor or a camera, and the attribute(s) may include a location, velocity and/or acceleration of at least a portion (e.g., finger, fingertip) of the hand. A determination may be made at block 50 as to whether the one or more motion attributes correspond to an impending impact between the hand-based object and the touchscreen. Block 50 may include using one or more impact prediction rules. For example, the rules might specify a combination of location (e.g., distance), velocity and/or acceleration in order for an impending impact to be inferred (e.g., a finger located at a minimum distance of X centimeters and moving at a minimum of Y centimeters per second).

If an impending impact is predicted, illustrated block 52 initiates a halt (e.g., pause, stoppage) of one or more user interface updates associated with the touchscreen. Block 52 might include, for example, pausing the addition of search results and/or pausing the scrolling of content on the UI in response to the prediction. Additionally, block 54 may record event data that indicates whether the impending impact took place as predicted, wherein one or more of the impact prediction rules may be adjusted at block 56 based on the event data. Block 56 may include, for example, tightening one or more constraints (e.g., decreasing the minimum distance) in response to a false positive (e.g., a predicted impending impact did not occur), loosening one or more constraints (e.g., increasing the minimum velocity) in response to a false negative (e.g., an impact occurred that was not predicted), and so forth. Other machine learning techniques may also be used to improve touchscreen usage accuracy and/or performance. Moreover, block 56 might also take into consideration the orientation of the device during predicted touch events. Thus, different device orientations may be associated with different impact prediction rules.

A determination may be made at block 58 as to whether the impending impact has been completed (e.g., the predicted touch event has occurred) or cancelled (e.g., the hand/finger is no longer detected). If so, illustrated block 60 initiates a resumption of the one or more updates. Accordingly, block 60 might include for example, resuming the addition of search results and/or the scrolling of content on the UI. Illustrated block 58 repeats until a completion/cancellation is detected and if an impending impact is not detected at block 50, the illustrated method 44 terminates.

Figure 5:
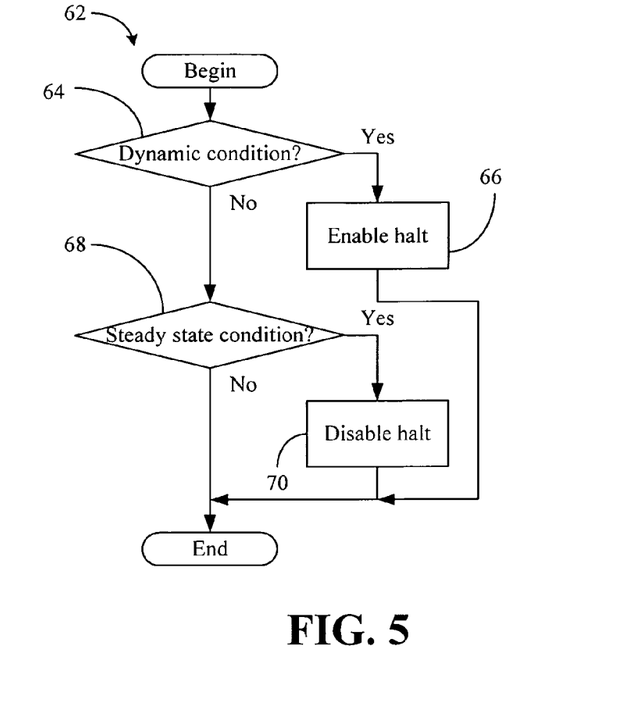
FIG. 5 is a flowchart of an example of a method of optimizing power consumption in an accuracy improvement apparatus according to an embodiment.

FIG. 5 shows a method 62 of optimizing power in an accuracy improvement apparatus. The method 62 may generally be implemented in a computing device such as, for example, the computing device 10 (FIG. 1) and/or the computing device 20 (FIG. 2), already discussed. More particularly, the method 62 may be implemented as a module or related component in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 64 determines whether a dynamic condition is satisfied with respect to a user interface. The dynamic condition may include, for example, a scrolling state (e.g., content is being shifted out of and/or into the user interface), a populating state (e.g., content is being added to the user interface), and so forth. If the dynamic condition is satisfied, block 66 may enable the halt of one or more updates to the user interface. Block 66 may therefore activate operation of a touch event prediction process such as, for example, the method 44 (FIG. 4), already discussed.

If, on the other hand, the dynamic condition is not satisfied at block 64, illustrated block 68 may determine whether a steady state condition is satisfied with respect to the user interface. The steady state condition may include, for example, the user interface being static in nature. If the steady state condition is satisfied, illustrated block 70 disables the halt of one or more updates to the user interface. Block 70 may therefore deactivate operation of a touch event prediction process such as, for example, the method 44 (FIG. 4), already discussed. Accordingly, block 70 may conserve power by limiting touch event predictions to circumstances in which inaccurate touch events are most likely to occur. Moreover the use of both determination blocks 64 and 68 may provide a hysteresis effect that optimizes state transitions between touch prediction and non-touch prediction states.

Figure 6:
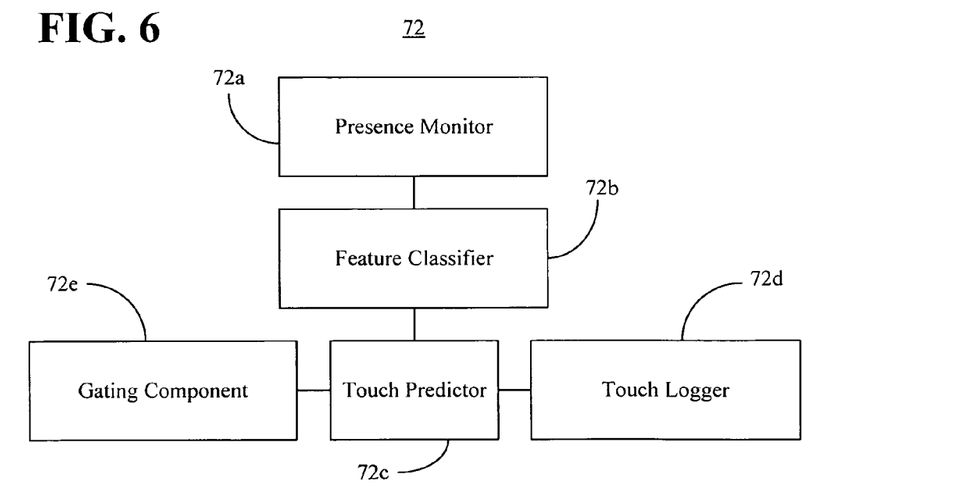
FIG. 6 is a block diagram of an example of an accuracy improvement apparatus according to an embodiment.

FIG. 6 shows an accuracy improvement apparatus 72 (72a-72e) that may be used to implement one or more aspects of the method 44 (FIG. 4) and/or the method 62 (FIG. 5), already discussed. The illustrated apparatus 72, which may include logic instructions, configurable logic, fixed-functionality hardware logic, etc., or any combination thereof, includes a presence monitor 72a to detect a hand-based object (e.g., hand, finger, thumb, fingertip, glove, stylus) in front of a touchscreen. The presence monitor 72a may detect the hand-based object based on a signal from one or more of a MIR device, an IR depth sensor or a camera. A feature classifier 72b may be communicatively coupled to the presence monitor, wherein the feature classifier 72b determines one or more motion attributes of the detected hand-based object. The motion attributes may include, for example, a location, velocity and/or acceleration of the hand-based object.

The illustrated apparatus 72 also includes a touch predictor 72c communicatively coupled to the feature classifier 72b, wherein the touch predictor 72c is configured to initiate a halt of one or more user interface updates associated with the touchscreen if the one or more motion attributes correspond to an impending impact between the hand-based object and the touchscreen. For example, the touch predictor 72c might forward an interrupt, message or other trigger to an operating system (OS) and/or application running on the computing device in order to announce the predicted touch event. The OS/application may in turn perform the halt of UI updates in response to the trigger. Additionally, a touch logger 72d may record event data that indicates whether the impending impact took place. The touch logger 72d may store the event data to any suitable memory (not shown)

such as, for example, non-volatile memory (NVM), volatile memory and/or one or more registers.

In one example, the touch predictor 72c determines whether the one or more motion attributes correspond to the impending impact in accordance with one or more impact prediction rules. In such a case, the touch predictor 72c may adjust at least one of the impact prediction rule(s) based on the event data. The illustrated apparatus 72 also includes a gating component 72e communicatively coupled to the touch predictor 72c. The gating component 72e may enable halts of UI updates if a dynamic condition is satisfied with respect to the UI and disable halts of UI updates if a steady state condition is satisfied with respect to the UI.

Figure 7:
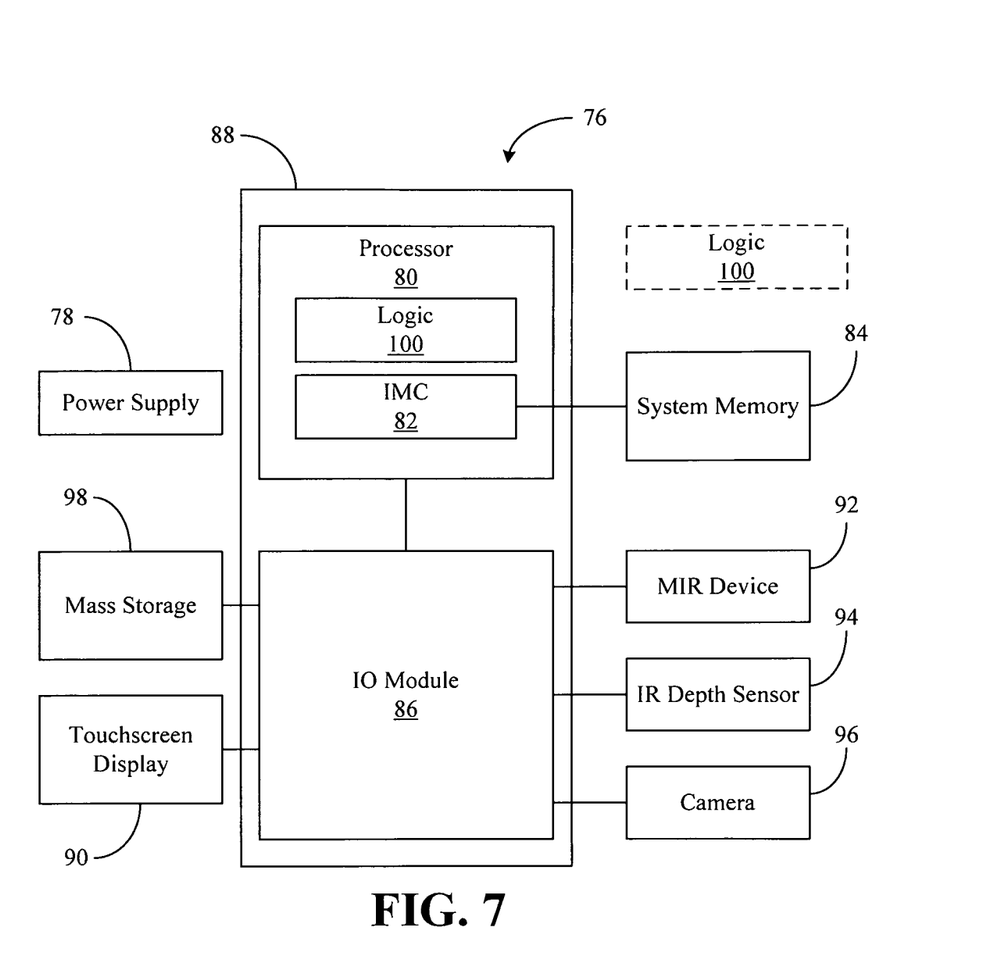
FIG. 7 is a block diagram of an example of a system according to an embodiment.

FIG. 7 shows computing device 76 that may be part of a kiosk, tablet computer, smart phone, personal digital assistant (PDA), mobile Internet device (MID), media player, etc., or any combination thereof. The illustrated computing device 76 includes a power supply 78 to supply power to the device 76 and a processor 80 having an integrated memory controller (IMC) 82, which may communicate with system memory 84. The system memory 84 may include, for example, dynamic random access memory (DRAM) configured as one or more memory modules such as, for example, dual inline memory modules (DIMMs), small outline DIMMs (SODIMMs), etc.

The illustrated device 76 also includes an input output (IO) module 86 implemented together with the processor 80 on a semiconductor die 88 as a system on chip (SoC), wherein the 10 module 86 functions as a host device and may communicate with, for example, a touchscreen display 90, an MIR device 92, an IR depth sensor 94, a camera 96, and mass storage 98 (e.g., optical disk, hard disk drive/HDD, flash memory, block storage, solid state disk/SSD, etc.). The processor 80 may include logic 100 (e.g., implemented in logic instructions, configurable logic, fixed-functionality logic hardware, etc., or any combination thereof) that detects a hand-based object (e.g., hand, finger, thumb, fingertip, glove, stylus) in front of the touchscreen display 90, determines one or more motion attributes of the detected hand-based object, and initiates a halt of one or more UI updates associated with the touchscreen display 90 if the one or more motion attributes correspond to an impending impact between the hand-based object and the touchscreen display 90. In one example, the hand-based object is detected based on one or more signals from the MIR device 92, the IR depth sensor 94 and/or the camera 96. Thus, the logic 100 may implement one or more aspects of the method 44 (FIG. 4) and/or the method 62 (FIG. 5), already discussed.

ADDITIONAL NOTES AND EXAMPLES

Example 1 may include an apparatus to improve touchscreen accuracy comprising a presence monitor to detect a hand-based object in front of a touchscreen, a feature classifier communicatively coupled to the presence monitor, the feature classifier to determine one or more motion attributes of the detected hand-based object, and a touch predictor communicatively coupled to the feature classifier, the touch predictor to initiate a halt of one or more updates of a user interface displayed on the touchscreen if the one or more motion attributes correspond to an impending impact between the hand-based object and the touchscreen.

Example 2 may include the apparatus of Example 1, wherein the hand-based object is to be detected based on a signal from one or more of a micro-impulse radar device, an infrared depth sensor or a camera.

Example 3 may include the apparatus of Example 1, wherein the one or more motion attributes are to include one or more of a location, a velocity or an acceleration of the hand-based object.

Example 4 may include the apparatus of Example 1, further including a touch logger to record event data that indicates whether the impending impact took place.

Example 5 may include the apparatus of Example 4, wherein the touch predictor is to determine whether the one or more motion attributes correspond to the impending impact in accordance with one or more impact prediction rules and adjust at least one of the one or more impact prediction rules based on the event data.

Example 6 may include the apparatus of Example 1, further including a gating component communicatively coupled to the touch predictor, the gating component to enable the halt if a dynamic condition is satisfied with respect to the user interface and disable the halt if a steady state condition is satisfied with respect to the user interface.

Example 7 may include the apparatus of Example 6, wherein the dynamic condition is to include one or more of a scrolling state or a populating state.

Example 8 may include the apparatus of any one of Examples 1 to 7, wherein the touch predictor is to initiate a resumption of the one or more updates in response to one or more of a completion of the impending impact or a cancellation of the impending impact.

Example 9 may include a method of operating an accuracy improvement apparatus, comprising detecting a hand-based object in front of a touchscreen, determining one or more motion attributes of the detected hand-based object, and initiating a halt of one or more updates of a user interface displayed on the touchscreen if the one or more motion attributes correspond to an impending impact between the hand-based object and the touchscreen.

Example 10 may include the method of Example 9, wherein the hand-based object is detected based on a signal from one or more of a micro-impulse radar device, an infrared depth sensor or a camera.

Example 11 may include the method of Example 9, wherein the one or more motion attributes include one or more of a location, a velocity or an acceleration of the hand-based object.

Example 12 may include the method of Example 9, further including recording event data that indicates whether the impending impact took place.

Example 13 may include the method of Example 12, further including determining whether the one or more motion attributes correspond to the impending impact in accordance with one or more impact prediction rules, and adjusting at least one of the one or more impact prediction rules based on the event data.

Example 14 may include the method of Example 9, further including enabling the halt if a dynamic condition is satisfied with respect to the user interface, and disabling the halt if a steady state condition is satisfied with respect to the user interface.

Example 15 may include the method of Example 14, wherein the dynamic condition includes one or more of a scrolling state or a populating state.

Example 16 may include the method of any one of Examples 9 to 15, further including initiating a resumption of the one or more updates in response to one or more of a completion of the impending impact or a cancellation of the impending impact.

Example 17 may include at least one computer readable storage medium comprising a set of instructions, which when executed by a computing device, cause the computing device to detect a hand-based object in front of a touchscreen, determine one or more motion attributes of the detected hand-based object, and initiate a halt of one or more updates of a user interface displayed on the touchscreen if the one or more motion attributes correspond to an impending impact between the hand-based object and the touchscreen.

Example 18 may include the at least one computer readable storage medium of Example 17, wherein the hand-based object is to be detected based on a signal from one or more of a micro-impulse radar device, an infrared depth sensor or a camera.

Example 19 may include the at least one computer readable storage medium of Example 17, wherein the one or more motion attributes are to include one or more of a location, a velocity or an acceleration of the hand-based object.

Example 20 may include the at least one computer readable storage medium of Example 17, wherein the instructions, when executed, cause a computing device to record event data that indicates whether the impending impact took place.

Example 21 may include the at least one computer readable storage medium of Example 20, wherein the instructions, when executed, cause a computing device to determine whether the one or more motion attributes correspond to the impending impact in accordance with one or more impact prediction rules, and adjust at least one of the one or more impact prediction rules based on the event data.

Example 22 may include the at least one computer readable storage medium of Example 17, wherein the instructions, when executed, cause a computing device to enable the halt if a dynamic condition is satisfied with respect to the user interface, and disable the halt if a steady state condition is satisfied with respect to the user interface.

Example 23 may include the at least one computer readable storage medium of Example 22, wherein the dynamic condition is to include one or more of a scrolling state or a populating state.

Example 24 may include the at least one computer readable storage medium of any one of Examples 17 to 23, wherein the instructions, when executed, cause a computing device to initiate a resumption of the one or more updates in response to one or more of a completion of the impending impact or a cancellation of the impending impact.

Example 25 may include an apparatus to improve touchscreen usage accuracy comprising means for detecting a hand-based object in front of a touchscreen, means for determining one or more motion attributes of the detected hand-based object, and means for initiating a halt of one or more user interface updates associated with the touchscreen if the one or more motion attributes correspond to an impending impact between the hand-based object and the touchscreen.

Example 26 may include the apparatus of Example 25, wherein the hand-based object is to be detected based on a signal from one or more of a micro-impulse radar device, an infrared depth sensor or a camera.

Example 27 may include the apparatus of Example 25, wherein the one or more motion attributes are to include one or more of a location, a velocity or an acceleration of the hand-based object.

Example 28 may include the apparatus of Example 25, further including means for recording event data that indicates whether the impending impact took place.

Example 29 may include the apparatus of Example 28, further including means for determining whether the one or more motion attributes correspond to the impending impact in accordance with one or more impact prediction rules, and means for adjusting at least one of the one or more impact prediction rules based on the event data.

Example 30 may include the apparatus of Example 25, further including means for enabling the halt if a dynamic condition is satisfied with respect to the user interface, and means for disabling the halt if a steady state condition is satisfied with respect to the user interface.

Example 31 may include the apparatus of Example 30, wherein the dynamic condition is to include one or more of a scrolling state or a populating state.

Example 32 may include the apparatus of any one of Examples 25 to 31, further including means for initiating a resumption of the one or more updates in response to one or more of a completion of the impending impact or a cancellation of the impending impact.

Techniques described herein may therefore improve usage accuracy in touchscreen devices where displayed content updates faster than the physical reactions of the user. For example, the rearranging of items on the display may be temporarily halted while touch events are ongoing/incoming.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
a presence monitor to detect a hand-based object in front of a touchscreen;
a feature classifier communicatively coupled to the presence monitor, the feature classifier to determine one or more motion attributes of the detected hand-based object; and
a touch predictor communicatively coupled to the feature classifier, the touch predictor to determine if the one or more motion attributes correspond to an impending impact between the hand-based object and the touchscreen in accordance with one or more impact prediction rules that specify a combination of constraints in order for an impending future impact to be inferred, the constraints including one or more of a location, a velocity or an acceleration, the touch predictor to initiate a halt of one or more user interface updates of a user interface associated with the touchscreen if the touch predictor determines that the one or more motion attributes correspond to the impending impact between the hand-based object and the touchscreen, the touch predictor to adjust the one or more impact prediction rules based upon whether an unpredicted touch event occurred.

2. The apparatus of claim 1, wherein the hand-based object is to be detected based on a signal from one or more of a micro-impulse radar device, an infrared depth sensor or a camera.

3. The apparatus of claim 1, wherein the constraints are to include each of the location, the velocity and the acceleration, and
the touch predictor is to compare the one or more motion attributes to the constraints to determine if the one or more motion attributes correspond to the impending impact.

4. The apparatus of claim 1, further including a touch logger to record event data that indicates whether the impending impact took place.

5. The apparatus of claim 4, wherein the touch predictor is to adjust at least one of the one or more impact prediction rules based on the event data.

6. The apparatus of claim 1, further including a gating component communicatively coupled to the touch predictor, the gating component to enable the halt if a dynamic condition is satisfied with respect to the user interface and disable the halt if a steady state condition is satisfied with respect to the user interface.

7. The apparatus of claim 6, wherein the dynamic condition is to include one or more of a scrolling state or a populating state.

8. The apparatus of claim 1, wherein the touch predictor is to initiate a resumption of the one or more updates in response to one or more of a completion of the impending impact or a cancellation of the impending impact.

9. A method comprising:
detecting a hand-based object in front of a touchscreen;
determining one or more motion attributes of the detected hand-based object;
determining if the one or more motion attributes correspond to an impending impact between the hand-based object and the touchscreen in accordance with one or more impact prediction rules that specify a combination of constraints in order for an impending future impact to be inferred, the constraints including one or more of a location, a velocity or an acceleration;
initiating a halt of one or more user interface updates of a user interface associated with the touchscreen if the one or more motion attributes correspond to the impending impact between the hand-based object and the touchscreen; and
adjusting the one or more impact prediction rules based upon whether an unpredicted touch event occurred.

10. The method of claim 9, wherein the hand-based object is detected based on a signal from one or more of a micro-impulse radar device, an infrared depth sensor or a camera.

11. The method of claim 9, wherein the constraints include each of the location, the velocity and the acceleration, and
the determining if the one or more motion attributes correspond to the impending impact includes comparing the one or more motion attributes to the constraints.

12. The method of claim 9, further including recording event data that indicates whether the impending impact took place.

13. The method of claim 12, further including:
adjusting at least one of the one or more impact prediction rules based on the event data.

14. The method of claim 9, further including:
enabling the halt if a dynamic condition is satisfied with respect to the user interface; and
disabling the halt if a steady state condition is satisfied with respect to the user interface.

15. The method of claim 14, wherein the dynamic condition includes one or more of a scrolling state or a populating state.

16. The method of claim 9, further including initiating a resumption of the one or more updates in response to one or more of a completion of the impending impact or a cancellation of the impending impact.

17. At least one computer readable storage medium comprising a set of instructions, which when executed by a computing device, cause the computing device to:
detect a hand-based object in front of a touchscreen;
determine one or more motion attributes of the detected hand-based object;
determine if the one or more motion attributes correspond to an impending impact between the hand-based object and the touchscreen in accordance with one or more impact prediction rules that specify a combination of constraints in order for an impending future impact to be inferred, the constraints including one or more of a location, a velocity or an acceleration;

initiate a halt of one or more user interface updates of a user interface associated with the touchscreen if the one or more motion attributes correspond to the impending impact between the hand-based object and the touchscreen; and adjust the one or more impact prediction rules based upon whether an unpredicted touch event occurred.

18. The at least one computer readable storage medium of claim 17, wherein the hand-based object is to be detected based on a signal from one or more of a micro-impulse radar device, an infrared depth sensor or a camera.

19. The at least one computer readable storage medium of claim 17, wherein the constraints are to include each of the location, the velocity and the acceleration, the determine if the one or more motion attributes correspond to the impending impact is to compare the one or more motion attributes to the constraints.

20. The at least one computer readable storage medium of claim 17, wherein the instructions, when executed, cause a computing device to record event data that indicates whether the impending impact took place.

21. The at least one computer readable storage medium of claim 20, wherein the instructions, when executed, cause a computing device to:

adjust at least one of the one or more impact prediction rules based on the event data.

22. The at least one computer readable storage medium of claim 17, wherein the instructions, when executed, cause a computing device to:

enable the halt if a dynamic condition is satisfied with respect to the user interface; and disable the halt if a steady state condition is satisfied with respect to the user interface.

23. The at least one computer readable storage medium of claim 22, wherein the dynamic condition is to include one or more of a scrolling state or a populating state.

24. The at least one computer readable storage medium of claim 17, wherein the instructions, when executed, cause a computing device to initiate a resumption of the one or more updates in response to one or more of a completion of the impending impact or a cancellation of the impending impact.

* * * * *